United States Patent
Ishihara et al.

(10) Patent No.: US 9,849,917 B2
(45) Date of Patent: Dec. 26, 2017

(54) COWL TOP COVER

(71) Applicants: NIHON PLAST CO., LTD., Fujinomiya-Shi, Shizuoka (JP); NISSAN MOTOR CO., LTD., Yokohama-Shi, Kanagawa (JP)

(72) Inventors: Ryo Ishihara, Fujinomiya (JP); Chikara Sano, Fujinomiya (JP); Nao Iwata, Yokohama (JP); Hidenori Kameoka, Yokohama (JP)

(73) Assignees: NIHON PLAST CO., LTD., Fujinomiya-Shi, Shizuoka (JP); NISSAN MOTOR CO., LTD., Yokohama-Shi, Kanagawa (JP)

( * ) Notice: Subject to any disclaimer, the term of this patent is extended or adjusted under 35 U.S.C. 154(b) by 135 days.

(21) Appl. No.: 15/026,274

(22) PCT Filed: Sep. 26, 2014

(86) PCT No.: PCT/JP2014/075582
§ 371 (c)(1),
(2) Date: Mar. 31, 2016

(87) PCT Pub. No.: WO2015/053093
PCT Pub. Date: Apr. 16, 2015

(65) Prior Publication Data
US 2016/0229459 A1   Aug. 11, 2016

(30) Foreign Application Priority Data
Oct. 10, 2013   (JP) ................. 2013-213083

(51) Int. Cl.
*B62D 25/08*   (2006.01)
*B62D 25/12*   (2006.01)
*B60R 21/34*   (2011.01)

(52) U.S. Cl.
CPC ............ *B62D 25/081* (2013.01); *B60R 21/34* (2013.01); *B62D 25/12* (2013.01); *B60R 2021/343* (2013.01)

(58) Field of Classification Search
CPC . B60R 21/34; B60R 2021/343; B62D 25/081; B62D 25/12
See application file for complete search history.

(56) References Cited

U.S. PATENT DOCUMENTS 8,186,749 B2 * 5/2012 Serizawa ............. B62D 25/081
296/192
8,807,634 B2 * 8/2014 Horimizu ................ B60R 21/34
296/187.04

(Continued)

FOREIGN PATENT DOCUMENTS

DE      3820644 A1 * 12/1989 ............ B60S 1/0402
DE 102006046268 A1 *  4/2008 ............ B60R 13/06

(Continued)

*Primary Examiner* — Glenn Dayoan
*Assistant Examiner* — Paul Chenevert
(74) *Attorney, Agent, or Firm* — Troutman Sanders LLP

(57) ABSTRACT

This cowl top cover has a cover body section and a vertical wall section which extends vertically from the front end of the cover body section. The vertical wall section is provided with a vertical wall body, an opening which is formed in the vertical wall body, and a cover section has a cover-side bending promotion section which extends in the width direction of the vehicle and which promotes the bending and deformation of the cover section to one side of the length direction of the vehicle. As a result of this configuration, the cowl top cover can consistently exhibit a sufficient impact absorption function when subjected to an impact.

10 Claims, 8 Drawing Sheets

(56) References Cited

U.S. PATENT DOCUMENTS

| | | | |
|---|---|---|---|
| 8,985,678 B2 * | 3/2015 | Sugishima | B60R 13/0838 |
| | | | 296/192 |
| 9,764,771 B1 * | 9/2017 | Hiwatashi | B62D 25/081 |
| 2008/0246311 A1 * | 10/2008 | Hagino | B60H 1/28 |
| | | | 296/192 |
| 2014/0265446 A1 * | 9/2014 | Ellison | B62D 25/081 |
| | | | 296/192 |

FOREIGN PATENT DOCUMENTS

| | | | | |
|---|---|---|---|---|
| EP | 1946994 A2 * | 7/2008 | | B62D 25/081 |
| FR | 2874577 A1 * | 3/2006 | | B62D 25/081 |
| JP | 2009083637 A * | 4/2009 | | B60R 21/34 |
| JP | 4613985 B2 * | 1/2011 | | B62D 25/081 |
| JP | 2015044564 A * | 3/2015 | | B62D 25/081 |

* cited by examiner

COWL TOP COVER

CROSS-REFERENCE TO RELATED APPLICATIONS

This application is the U.S. National Phase of International Patent Application Serial No. PCT/JP2014/075582, filed Sep. 26, 2014, which claims priority to Japanese Patent Application No. 2013-213083, filed Oct. 10, 2013, both of which are herein incorporated by reference in their entireties.

TECHNICAL FIELD

The invention relates to a cowl top cover configured to cover a cowl section disposed between a windshield and a hood of a vehicle.

BACKGROUND

For example, in Japanese Unexamined Patent Application Publication No. 2011-5988 A (JP '988), in the structure where an opening is disposed in the vertical wall section of the cowl top cover, and a cover section for closing the opening is attached to the vertical wall section, the technique where a rib is disposed on the inner surface facing inside the cowl section of the cover section for closing the opening, and an inclined side is formed on the rib is disclosed.

According to the cowl top cover structure of JP '988, when the vertical wall section of the cowl top cover is deformed in a manner so as to be crushed from the upper side, the upper side of the opening in the vertical wall section is made to slide with respect to the inclined side of the cover section, and the rotational moment of the cover section around the hook section of the vertical wall section disposed at the bottom of the cover section is acted. As a result, the cover section that has blocked the opening to support is removed from the vertical wall section, and the vertical wall section can be easily deformed, and therefore the impact absorption performance in the cowl top cover, for example, when an object collides with the hood and the like can be improved.

SUMMARY OF THE INVENTION

In the cowl top cover structure described in JP '988, the elevation surface of the cover section attached to the vertical wall section so as to block the opening coincides with the standing direction of the vertical wall section. In this case, when, for example, an object (collision object) collides with the position as shown in FIG. 4 in JP '988, the upper side of the opening slides with respect to the inclined side of the rib disposed in the cover section, and the cover section is relatively pushed frontward, whereby the cover section is tilted toward the front of the vehicle to be removed from the vertical wall section. Thus, the support of the opening is released, and the vertical wall section can be easily deformed.

However, when an object collides, for example, from a direction along the position of the elevation surface of the cover section, the effect of sliding the upper side of the opening with respect to the inclined side of the cover section is weakened, and the direction of the elevation surface of the cover section matches the downward direction of the collision object, and therefore there is a concern that the cover section supports the vertical wall section.

In addition, when an inclined side is tried to be configured such that, for example, the cover section is removed more easily so as to reduce the above concern, it is necessary to take measures to adjust the angle of the inclined side in accordance with the shape of the vehicle, and to optimize the shape of the rib where the inclined side is disposed. Therefore, the production cost is increased, and the design limitations such as the rib and the like being made relatively larger, the cover section being made relatively smaller, or the opening being arranged in the lower part of the vertical wall section occur, and therefore there is a problem that it is difficult to configure the cover section and the opening so that the usability is improved.

The invention is made in view of the above conventional problem, and the specific object is to provide a cowl top cover preventing the cover section configured to block the opening of the vertical wall section from inhibiting the effect of the vertical wall section collapsing to reduce the height dimension, and capable of stably exhibiting the effect of absorbing the impact the object receives, even when the object collides with a wider range in the rear end section of the hood.

To achieve the above object, the cowl top cover provided by the invention is most mainly characterized in that the cowl top cover includes a cover body section configured to cover a cowl section disposed between a windshield and a hood of a vehicle, and a vertical wall section suspended from one end section of the cover body section; the vertical wall section includes a vertical wall body, at least one opening formed in the vertical wall body, and a cover section configured to cover the opening, attachable to and detachable from the vertical wall body; and the cover section includes a cover-side bending promotion section disposed along a vehicle width direction, configured to prompt bending deformation on one side in a vehicle length direction.

In the cowl top cover according to the invention, the cover-side bending promotion section preferably includes a swelling section configured to swell on one side in a vehicle length direction.

In this case, the swelling section preferably swells in a V-shape. In addition, the swelling section preferably swells frontward in a vehicle length direction.

In addition, in the cowl top cover according to the invention, the swelling section of the cover section is preferably disposed in a central region in a vehicle width direction in the cover section, and in a peripheral section of the swelling section, a flat cover section body is preferably disposed along the vertical wall body. Furthermore, a maximum dimension in a vehicle width direction of the swelling section is preferably set to 30% or more of a dimension in a vehicle width direction of the cover section.

Furthermore, in the cowl top cover according to the invention, the swelling section preferably includes an upper inclined section and a lower inclined section inclined toward one side in a vehicle length direction from the cover section body, and a gradually decreasing section disposed on both left and right sides of the upper inclined section and the lower inclined section, the gradually decreasing section causing a swelling amount with respect to the cover section body to gradually decrease toward the left and right side edge sides of the cover section.

In this case, a ridge section between the upper inclined section and the lower inclined section in the swelling section is preferably disposed lower than a height position of a center line in a vehicle height direction of the cover section along a vehicle width direction.

In addition, a recessed groove section is preferably recessed on a surface facing the other side in a vehicle length direction in the cover section body and the swelling section, and the recessed groove section is preferably disposed corresponding to the height position where the ridge section between the upper inclined section and the lower inclined section in the swelling section is disposed.

Furthermore, in the cowl top cover according to the invention, an upper side claw section and a lower side claw section engageable with and disengageable from the vertical wall body are respectively disposed in an upper end section and a lower end section of the cover section preferably, and the upper side claw section and the lower side claw section are preferably disposed in a position corresponding to a forming region of the swelling section in a vehicle width direction, and in a position corresponding to an end section of the swelling section.

Furthermore, in the cover section of the cowl top cover according to the invention, at least one reinforcement vertical rib is preferably disposed, and the reinforcement vertical rib preferably has a bent form so as to protrude in a direction where the cover-side bending promotion section prompts bending deformation.

The cowl top cover according to the invention includes a cover body section configured to cover the cowl section, and a vertical wall section suspended from one end of the cover body section; and the vertical wall section includes a vertical wall body, at least one opening formed in the vertical wall body, and a cover section configured to cover the opening, attachable to and detachable from the vertical wall body. In addition, the cover section of the vertical wall section includes a cover-side bending promotion section configured to promote the bending deformation along the vehicle width direction of the cover section on one direction side in the vehicle length direction (for example, frontward).

If the cowl top cover includes this cover section, when the cowl top cover receives an impact by an object colliding from above with, for example, the cowl top cover and a wide range of the hood, the vertical wall body of the vertical wall section deforms in a manner so as to be crushed by the impact force (impact load) regardless of the collision position and the collision direction of the object, and the cover-side bending promotion section promotes the bending deformation of the cover section effectively, and the entire cover section can be deformed in a manner so as to be crushed in the vehicle height direction while part of the cover section is displaced so as to protrude toward one of the vehicle length direction.

Thus, the bending deformation of the cover section is guided in a predetermined direction to proceed by the cover-side bending promotion section, whereby the cover section can crush the cover section and the vertical wall body stably so that the height dimension is reduced without inhibiting the deformation of the vertical wall body, and furthermore the action of the cover section coming off the vertical wall body can be promoted. Thus, the reaction force acting on the object colliding with the cowl top cover and the hood is reduced, and the impact the object receives can be absorbed effectively to be relaxed, and therefore the sufficient impact absorption function can be stably obtained.

In the cowl top cover of the invention, the cover-side bending promotion section includes a swelling section swelling on one side of the vehicle length direction. As a result, when the vertical wall body of the vertical wall section is deformed in a manner so as to be crushed, the bending deformation of the cover section is effectively promoted by the swelling section, and the cover section can be stably crushed.

In this case, the swelling section swells in a V-shape, whereby the bending deformation of the cover section can be promoted more effectively.

In addition, the swelling section swells frontward in the vehicle length direction, whereby when the vertical wall body of the vertical wall section is deformed in a manner so as to be crushed, the cover section can be stably bent and deformed frontward in the vehicle length direction. Furthermore, when the cover section is removed from the vertical wall body, if the swelling section swells frontward in the vehicle length direction, the cover section can be easily removed to drop frontward in the vehicle length direction.

Thereby, it can be prevented that the cover section remaining while engaged with the vertical wall body cannot promote the deformation of the vertical wall body. In particular, the swelling direction of the swelling section for swelling in a V-shape is directed frontward in the vehicle length direction, whereby the cover section can be more effectively bent and deformed frontward in the vehicle length direction, and the cover section can be more easily removed to drop from the vertical wall body frontward in the vehicle length direction.

In addition, in the cowl top cover of the invention, the swelling section of the cover section is disposed in the central region in the vehicle width direction in the cover section, and the flat-plate-shaped cover section body is disposed along the vertical wall body on the periphery of the swelling section. As a result, when the cover section is engaged with the vertical wall body, the sealing performance between the cover section and the vertical wall body can be enhanced, and the cover section body of the cover section and the vertical wall body are disposed substantially in parallel, and can be made to appear like a continuous surface, and therefore the quality of appearance (appearance) of the vertical wall section can be improved.

Furthermore, the maximum dimension in the vehicle width direction of the swelling section is set to be 30% or more of the dimension in the vehicle width direction of the cover section, preferably 50% or more. The swelling section having a width dimension of this range is provided, whereby when the vertical wall body is deformed in a manner so as to be crushed in the vehicle height direction, the bending deformation of the cover section can be effectively promoted, and the cover section can be stably crushed.

Furthermore, the swelling section includes an upper inclined section and a lower inclined section inclined toward one side in a vehicle length direction from the cover section body, and a gradually decreasing section disposed on both left and right sides of the upper inclined section and the lower inclined section, causing a swelling amount with respect to the cover section body to gradually decrease toward the left and right side edge sides of the cover section. The swelling section of the cover section is thus configured, whereby the swelling section can be efficiently provided in a central region in the vehicle width direction in the cover section, and the quality of appearance of the cover section (appearance) can be improved.

In this case, a ridge section between the upper inclined section and the lower inclined section in the swelling section is disposed lower than a height position of a center line in a vehicle height direction of the cover section along a vehicle width direction. As a result, when the vertical wall section receives the stress (load) in the direction of being crushed, the stress can be effectively focused on the swelling section of the cover section, and the bending deformation of the cover section can be stably promoted.

In addition, the recessed groove section is recessed on the surface facing the other side in the vehicle length direction in the cover section body and the swelling section, and the recessed groove section is disposed corresponding to the height position where the ridge section between the upper inclined section and the lower inclined section in the swelling section is disposed. The recessed groove section is thus provided, whereby the recessed groove section can also function as the bending promotion section of the cover section, and therefore the entire cover section can be more stably deformed in a manner so as to be crushed in the vehicle height direction.

Furthermore, in an upper end section and a lower end section of the cover section, an upper side claw section and a lower side claw section engageable with and disengageable from the vertical wall body are respectively disposed, and the upper side claw section and the lower side claw section are disposed in a position in the vehicle width direction corresponding to a forming region in the vehicle width direction of the swelling section. As a result, the stress (impact force) the cowl top cover receives can be caused to efficiently act on the cover-side bending promotion section of the cover section, and therefore the cover section can be quickly and reliably bent and deformed on one direction side by the cover-side bending promotion section.

Moreover, the upper side claw section and the lower side claw section of the cover section are disposed in the position corresponding to the end section of the swelling section in the vehicle width direction, in other words, the swelling section is disposed between the sections where the left and right upper side claw sections and the lower side claw sections are locked to the vertical wall body in the vehicle width direction, whereby when the vertical wall body is deformed in a manner so as to be crushed, the cover section receiving the stress is also easily crushed so that the swelling section given a shape in advance is caused to protrude in the swelling direction, and the cover section is partially lifted from the opening of the vertical wall body to be easily removed. Thereby, the impact of the cover section on the deformation of the vertical wall body can be extremely reduced, and the cowl top cover can be quickly and stably crushed, and therefore the impact absorption function can be effectively exhibited.

Furthermore, at least one reinforcement vertical rib is disposed in the cover section of the cowl top cover of the invention, and the reinforcement vertical rib has a bent form so as to protrude in the direction where the cover-side bending promotion section prompts the bending deformation (for example, frontward). The reinforcement vertical rib has this form, whereby the cover section can be reinforced, and when the cover section is bent and deformed prompted by the cover-side bending promotion section, the reinforcement vertical rib also can be stably bent and deformed, and therefore the cover section can be stably crushed.

DETAILED DESCRIPTION OF THE INVENTION

In the following, the preferred embodiments of the invention will be described in detail by using embodiments with reference to the drawings. It should be noted that the invention is not in anyway limited to the embodiments described below, and various changes are possible as long as they have substantially the same configurations and the same effect as in the invention.

For example, although in the cowl top cover described in each embodiment below, the vertical wall section of the cowl top cover includes one opening, and one cover section configured to block the opening, in the invention, the vertical wall section of the cowl top cover may include a plurality of openings, and a plurality of cover sections configured to block the respective openings.

Figure 1:
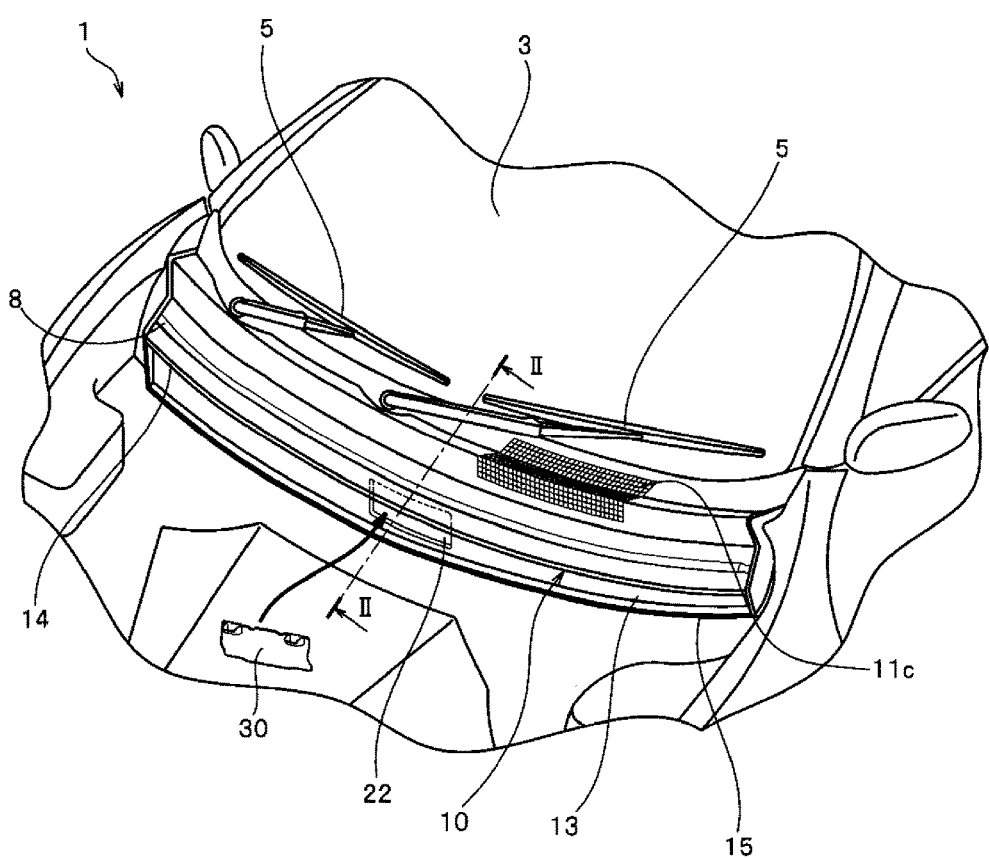
FIG. 1 is a principal part enlarged perspective view showing an enlarged view of the front section of the vehicle body of a vehicle.
Figure 2:
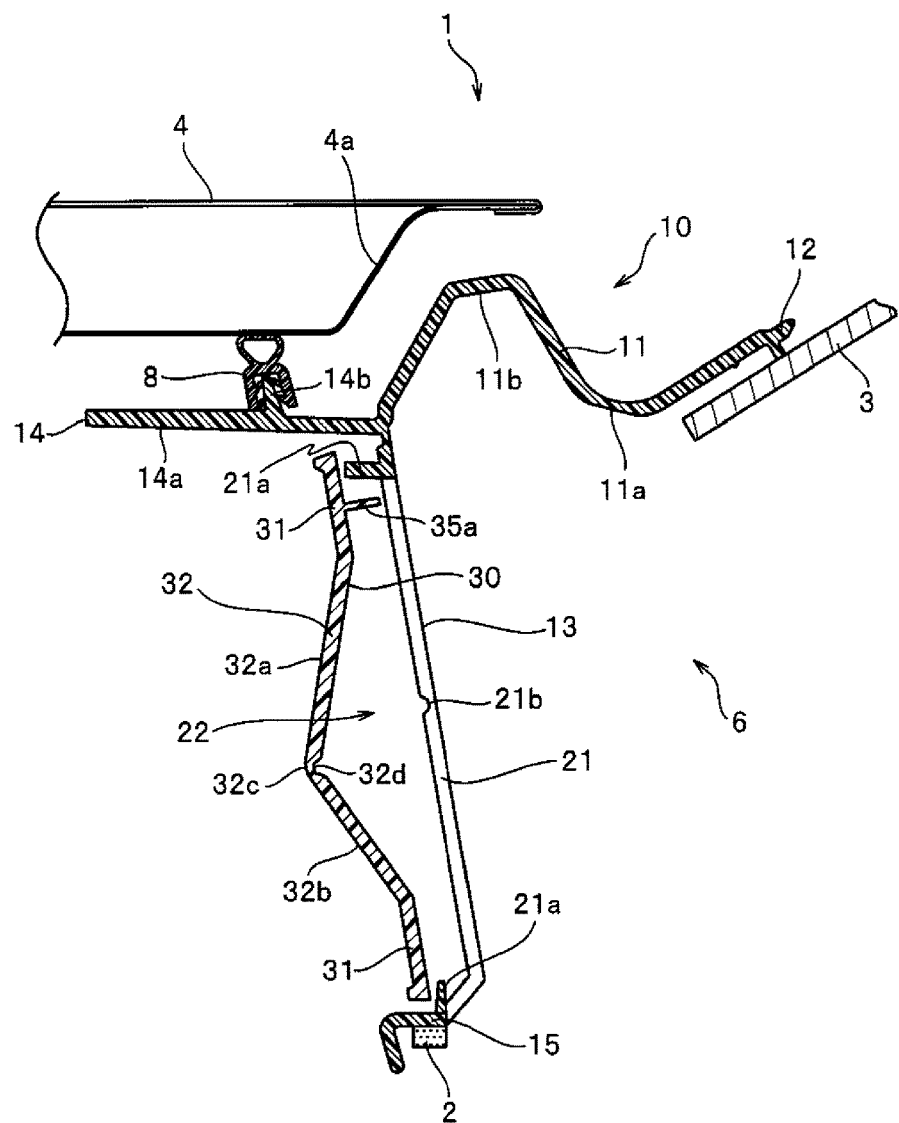
FIG. 2 is a cross-sectional view showing a cross-section of the cowl top cover according to a first embodiment of the invention.
Figure 3:
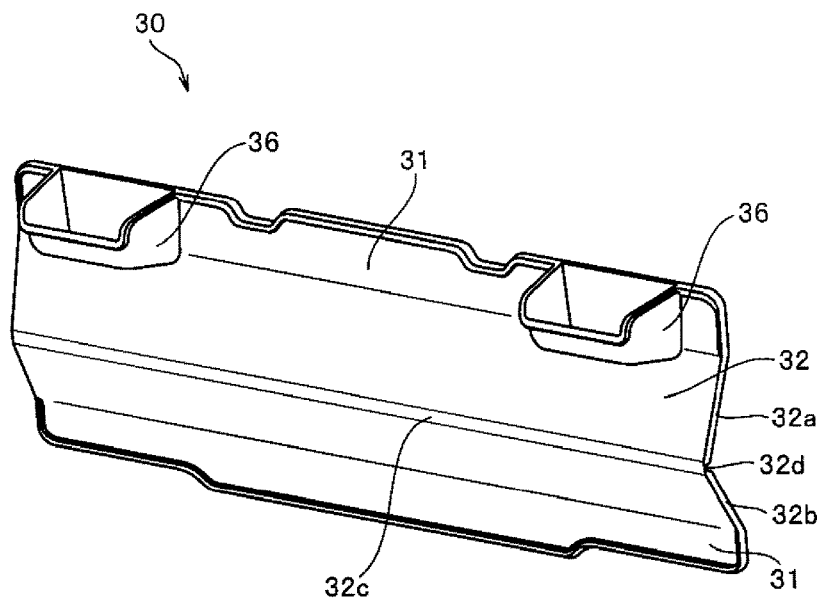
FIG. 3 is a perspective view of a cover section of the cowl top cover seen obliquely from the front side.
Figure 4:
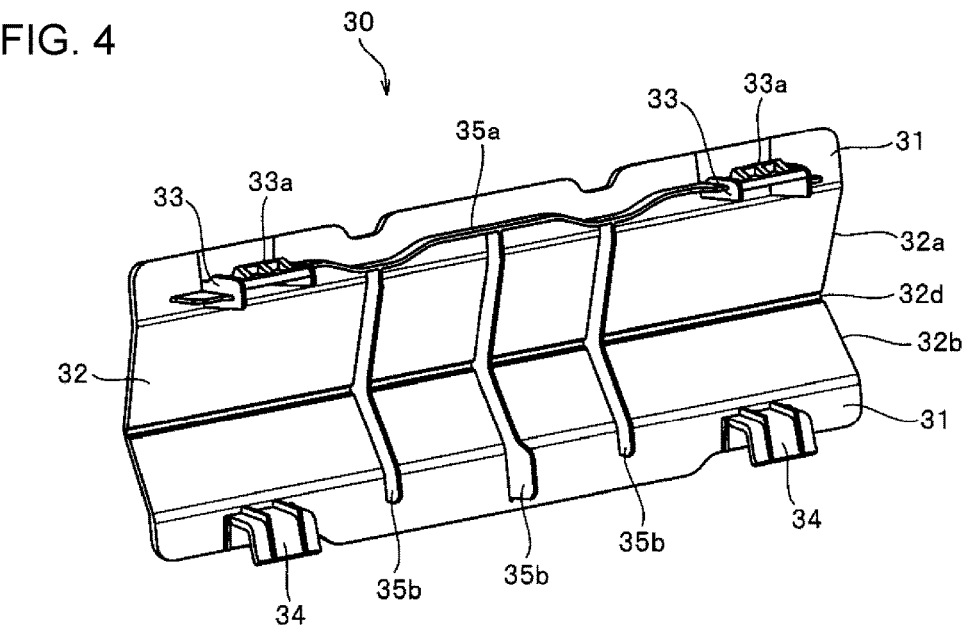
FIG. 4 is a perspective view of the cover section seen obliquely from the rear side.

FIG. 1 is a principal part enlarged perspective view showing an enlarged view of the front section of the vehicle body of a vehicle. FIG. 2 is a cross-sectional view showing a cross-section of the cowl top cover according to the present first embodiment. FIGS. 3 and 4 are perspective views of a cover section of the cowl top cover seen obliquely from the front and rear sides.

It should be noted that, in the description below, the front and rear direction means a vehicle length direction, the direction in which the vehicle moves frontward is set as "frontward", and the direction in which the vehicle moves backward is set as "rearward". The left and right direction means a vehicle width direction, and the left-hand and right-hand directions when the driver faces frontward are respectively set as "leftward" and "rightward". The vertical direction means a vehicle height direction, the direction on the ground side of the vehicle is set as "downward", and the direction on the opposite side is set as "upward".

In the vehicle 1 shown in FIGS. 1 and 2, the windshield 3 is disposed in front of the cabin, and the hood 4 is openably and closably disposed so as to cover the upper side of the engine room in the front section of the vehicle body. The windshield 3 is disposed upward inclined from the front end toward the rear end. In front of the windshield 3, a pair of left and right windshield wipers 5 are disposed, and these windshield wipers 5 are rotatably attached onto the glass surface of the windshield 3 by a drive motor (not shown).

A cowl section 6 opened upward is disposed between the hood 4 and the windshield 3, and an air intake section configured to introduce the outside air into the cabin of the air conditioner (not shown) is connected to the cowl section 6. To cover the cowl section 6, the cowl top cover 10 of the present first embodiment is attached to the vehicle body so as to be along the vehicle width direction. It should be noted that the mounting structure of the cowl top cover 10 with respect to the vehicle body can employ a commonly known conventional mounting structure.

The cowl top cover 10 of the present first embodiment is formed by injection molding a thermoplastic resin such as polypropylene, an acrylonitrile-butadiene-styrene copolymer, and a polyamide-based synthetic resin. It should be noted that in the invention, the material of the cowl top cover 10 is not particularly limited, and can be arbitrarily selected.

The cowl top cover 10 includes, as shown in the FIG. 2, a cover body section 11 configured to cover the cowl section 6, a cover rear end section 12 disposed on the rear end side of the cover body section 11 and secured to the windshield 3, a vertical wall section 13 suspended from the front end section of the cover body section 11 so as to partition the space between the engine room and the cowl section 6, an upper extending section 14 extending frontward from the upper end section of the vertical wall section 13, and a panel fixing section 15 disposed in the lower end section of the vertical wall section 13 and fixed to the support section of the vehicle body panel 2.

When the cross-section perpendicular to the vehicle width direction as shown in FIG. 2 is viewed, the cover body section 11 of the cowl top cover 10 is configured to include a first bent section 11a bent in a valley shape, and a second bent section 11b bent in a ridge shape in the region between the cover rear end section 12 and the front vertical wall section 13, and the first and second bent sections 11a and 11b are formed throughout in the vehicle width direction. In addition, as shown in FIG. 1, a grid-like air intake port (inlet port) 11c for introducing outside air into the vehicle body is disposed in a predetermined region in the vehicle width direction of the cover body section 11.

The upper extending section 14 of the cowl top cover 10 includes an extending body section 14a linearly extended frontward from the upper end section of the front vertical wall section 13, and a seal member fixing section 14b disposed on the top surface of the extending body section 14a. An elastically deformable seal member 8 is fixed to the seal member fixing section 14b of the upper extending section 14 by adhesion or the like.

Here, the seal member 8 is formed so as to have a hollow shape by using rubber or a thermoplastic elastomer, and the seal member 8 is disposed in a predetermined position, whereby when the hood 4 is closed, the seal member 8 is pressed against the reinforcement 4a disposed on the rear surface side of the hood 4, and can seal the space between the upper extending section 14 of the cowl top cover 10 and the hood 4. This prevents the hot air and odor from the engine room from leaking out on the upper surface side of the cover body section 11 through the space between the upper extending section 14 and the hood 4.

The vertical wall section 13 of the cowl top cover 10 includes a vertical wall body 21 to be the vertical wall section body, an opening 22 formed in a central section in the vehicle width direction in the vertical wall body 21, and a cover section 30 having a shape and dimension to cover the opening 22, attachable to and detachable from the vertical wall body 21.

The vertical wall body 21 is formed in a flat plate shape in the present first embodiment. It should be noted that the vertical wall body 21 may be formed by part of the vertical wall body 21 being partially swelled frontward in association with the shape of the swelling section 32 described below of the cover section 30. In addition, the vertical wall body 21 includes a frame section 21a formed around the opening 22, a first engaging section (not shown in FIG. 2) disposed in the upper side section of the frame section 21a and to be engaged with the insertion claw section 33 described below of the cover section 30, and a second engaging section (not shown in FIG. 2) disposed in the lower side section of the frame section 21a and to be engaged with the hold claw section 34 described below of the cover section 30.

In this case, the first engaging section includes a locking wall section suspended from the upper side section of the frame section 21a in the position corresponding to the insertion claw section 33 of the cover section 30. In addition, the second engaging section includes a base section extending from the lower side section of the frame section 21a in the position corresponding to the hold claw section 34 of the cover section 30, and a recessed notch section formed at the tip section of the base section, fitting the hold claw section 34.

Furthermore, in the substantially central section in the vertical direction of the vertical wall body 21, a recessed groove section 21b is recessed along the vehicle width direction. The recessed groove section 21b constitutes a vertical wall side deformation promotion section configured to prompt the vertical wall body 21 to bend and deform in the desired behavior, and the recessed groove section 21b is formed, whereby, as described below, when the cowl top cover 10 receives an impact, the vertical wall body 21 can be stably bent and deformed in the behavior such that the vertical wall body 21 is crushed in the vehicle height direction while the substantially central section in the vertical direction in the vertical wall body 21 is displaced rearward (see FIG. 5).

It should be noted that in the invention, the position of the recessed groove section 21b formed as a vertical wall side deformation promotion section in the vertical wall body 21 and the dimensions such as the groove width and the groove depth of the recessed groove section 21b are not particularly limited, and can be changed arbitrarily depending on the form of the cowl top cover 10 and the model and the like of the vehicle 1 where the cowl top cover 10 is used.

The opening 22 formed in the vertical wall body 21 has a substantially rectangular shape in the front view, and through the opening 22, it is possible, for example, to visually recognize the indication such as the chassis number engraved on the plate disposed in the rear of the vertical wall section 13 and to perform the maintenance on the electrical system components and the like disposed in the rear of or below the vertical wall section 13. It should be noted that in the invention, the shape and dimensions of the opening 22 can be arbitrarily changed.

The cover section 30 configured to block the opening 22 includes as shown in FIGS. 3 and 4, a cover section body 31 substantially disposed in parallel to the vertical wall body 21 in the upper end section and the lower end section of the cover section 30, and a swelling section 32 configured to swell frontward in a V-shape with respect to the cover section body 31. These cover section body 31 and the swelling section 32 have plate thicknesses of a predetermined size such that the vertical wall section 13 can secure the desired strength when the cover section 30 is attached to the vertical wall body 21.

In this case, the swelling section 32 is formed along the vehicle width direction, and includes an upper inclined section 32a inclined downward from the boundary section with the upper cover section body 31 toward the front, and a lower inclined section 32b inclined upward from the boundary section with the lower cover section body 31 toward the front, and in addition, the front end section (tip section) of the upper inclined section 32a and the front end section (tip section) of the lower inclined section 32b are connected to constitute a ridge section 32c.

The ridge section 32c is disposed over the entire region in the vehicle width direction in the cover section 30. In addition, the ridge section 32c in the present first embodiment is disposed slightly lower than the height position of the center line in the vertical direction of the cover section 30. The ridge section 32c is thus disposed, whereby when the vertical wall section 13 receives a stress (load) in the direction of being crushed, the stress can be most effectively focused on the swelling section 32.

The swelling section 32 constitutes a cover-side bending promotion section configured to prompt the cover section 30 to bend and deform in the desired behavior, and the cover section 30 includes the swelling section 32, whereby, as described below, when the cowl top cover 10 receives an impact, the entire cover section 30 can be bent and deformed in such behavior as to be crushed in the vehicle height direction while the swelling section 32 is displaced frontward.

In addition, on the inner wall surface side of the ridge section 32c in the swelling section 32, the recessed groove section 32d is recessed along the vehicle width direction as the cover-side bending promotion section. The recessed groove section (cover-side bending promotion section) 32d is disposed along the ridge section 32c, whereby when the cover section 30 bends and deforms by being prompted by the swelling section 32 being the cover-side bending promotion section, the swelling section 32 is more easily bent, and the bending deformation of the cover section 30 can be caused more effectively and stably. It should be noted that the formation of the recessed groove section 32d disposed along the ridge section 32c may be omitted, for example, when the strength of the cover section 30 is increased.

In addition, on the rear surface of the upper end section of the cover section 30, two insertion claw sections 33 protrude rearward to be disposed. On the upper surface side of each of the insertion claw sections 33, a locking claw 33a caught to be engageable with the first engaging section disposed on the upper side section of the vertical wall body 21 with the elastic deformation is formed in a hook-shape. In addition, each of the locking claws 33a is formed in the shape and dimensions for releasing the engaging state with the first engaging section of the vertical wall body 21 and being disengageable from the first engaging section when the vertical wall body 21 and the cover section 30 receive the impact to be bent and deformed.

On the rear surface of the lower end section of the cover section 30, two hold claw sections 34 protrude rearward in a substantially L-shape to be disposed, and hold the second engaging section disposed in the lower side section of the vertical wall body 21, whereby the two hold claw sections 34 can be engaged with the second engaging section. In this case, the left and right insertion claw sections 33 and the left and right hold claw sections 34 are disposed in the positional relation of being arranged vertically so that the relative positions in the vehicle width direction correspond to each other.

When the cover section 30 including the insertion claw section 33 and the hold claw section 34 in the present first embodiment is mounted on the vertical wall body 21, first, the hold claw section 34 of the cover section 30 is hooked to be held in the second engaging section of the vertical wall body 21 while the cover section 30 is aligned with respect to the vertical wall body 21 and the opening 22. Then, the cover section 30 is rotated toward the vertical wall body 21 with the hold claw section 34 as an axis, and the insertion claw section 33 of the cover section 30 is inserted into the opening 22. At this time, while the locking claw 33a of the insertion claw section 33 is elastically deformed, the insertion claw section 33 is in sliding contact with the frame section 21a of the vertical wall body 21. Furthermore, the cover section 30 is pushed into the vertical wall body 21, whereby the locking claw 33a is elastically returned, and the insertion claw section 33 is engaged with the first engaging section of the vertical wall body 21. As a result, the cover section 30 is attached to the vertical wall body 21 in such a manner as to cover the opening 22.

In addition, in the case of the present first embodiment, the swelling section 32 of the cover section 30 is, as described above, disposed throughout the entire region in the vehicle width direction in the cover section 30, and therefore in the cover section 30, the forming region in the vehicle width direction where the left and right insertion claw sections 33 and hold claw sections 34 are formed is included in the forming region in the vehicle width direction of the swelling section 32. The positional relation between the left and right insertion claw sections 33 and hold claw sections 34 and the swelling section 32 is thus set, whereby when the vertical wall body 21 receives an impact to receive a stress (load) in the direction of being crushed, the stress can be effectively caused to act on the swelling section 32 through the insertion claw section 33 and the hold claw section 34 of the cover section 30.

Furthermore, on the rear surface of the cover section 30, a reinforcement lateral rib 35a disposed along the lateral direction so as to connect the two insertion claw sections 33, and three reinforcement vertical ribs 35b disposed along the vertical direction and connected to the reinforcement lateral rib 35a are disposed.

The reinforcement lateral rib 35a in the present first embodiment is erected rearward from the rear surface on the upper end section side of the cover section body 31, and has a plurality of curved sections curved vertically with respect to the lateral direction, and is disposed so as to undulate slightly vertically.

The reinforcement vertical rib 35b has its upper end connected to the reinforcement lateral rib 35a, and is disposed from the upper end section side of the cover section body 31 to the lower end section side of the cover section body 31 through the swelling section 32. This reinforcement vertical rib 35b is formed so as to follow the cross-sectional shape of the cross section perpendicular to the lateral direction in the cover section body 31 and the swelling section 32, and when each of the reinforcement vertical ribs 35b is viewed from the lateral side surface side, the central portion in the vertical direction in the reinforcement vertical rib 35b has a form bent in a V-shape so as to protrude frontward. Each of the reinforcement vertical ribs 35b has this form, whereby when the cover section 30 is prompted by the cover-side bending promotion section to bend and deform, the reinforcement vertical rib 35b can also be stably bent and deformed along with the swelling section 32.

On the front surface of the upper end section of the cover section 30, two handle sections 36 are disposed so as to protrude frontward. For example, when the cover section 30 blocks the opening 22 by being engaged with the vertical wall body 21, the operator pulls the handle sections 36 of the cover section 30 while pressing the handle sections 36 down by hand, whereby the engaging state between the insertion claw section 33 of the cover section 30 and the first engaging section of the vertical wall body 21 can be released, and furthermore, the cover section 30 can be rotated to the front side with the hold claw section 34 as an axis. Then, the operator further pulls the cover section 30 by grasping the handle section 36, whereby the hold claw section 34 of the cover section 30 is detached from the second engaging section of the vertical wall body 21, and the cover section 30 can be removed from the vertical wall body 21.

In addition, in the present first embodiment, a cushioning material (not shown) with elasticity may also be fixed on the rear surface of the part overlapping with the vertical wall body 21 of the cover section 30 when the cover section 30 is attached to the vertical wall body 21. This cushioning material is attached, whereby the cover section 30 can be made difficult to scratch or damage due to the contact with the vertical wall body 21. In addition, by the cushioning material, the gap formed between the cover section 30 and the vertical wall body 21 (in particular, the gap formed between the swelling section 32 of the cover section 30 and the frame section 21a of the vertical wall body 21) can be filled, and the sealing performance between the cover section 30 and the vertical wall body 21 can be increased.

Figure 5:
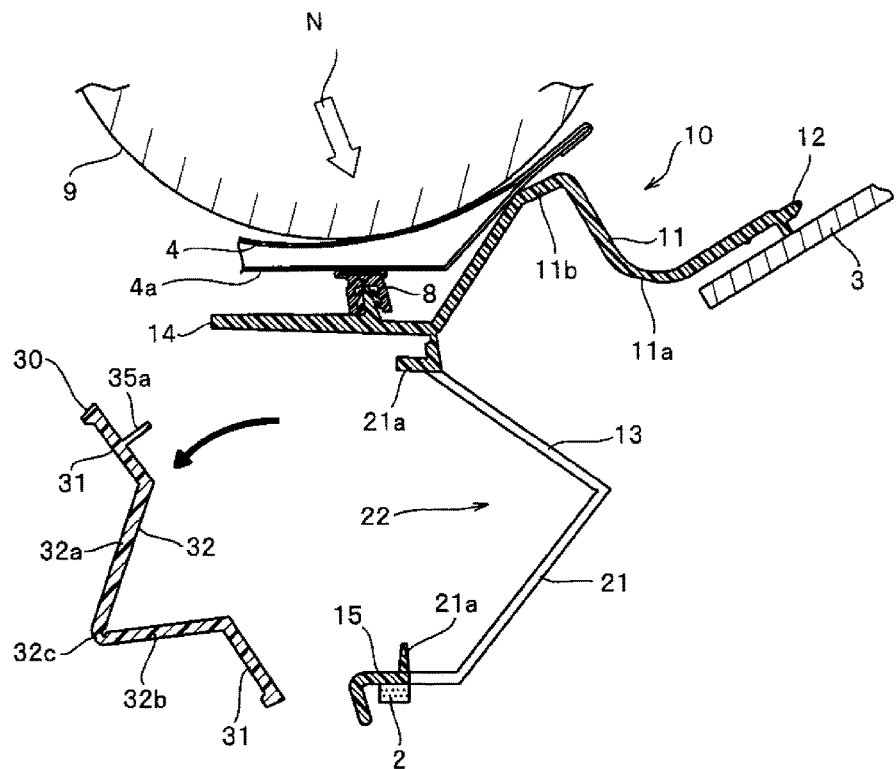
FIG. 5 is a cross-sectional illustrative diagram illustrating the state where the cowl top cover receives an impact.

In the cowl top cover 10 in the present first embodiment having the configuration described above, in a state where the cover section 30 is attached to the vertical wall body 21 in such a manner as to cover the opening 22, for example, when the object 9 collides with the hood 4 (or the cowl top cover 10) from the upper surface side, as shown in FIG. 5, the hood 4 receives an impact force (an impact load) N from above by the object 9.

In this case, the hood 4 receiving the impact force N deforms so as to narrow the space with the reinforcement 4a, and causes the seal member 8 to compress. In addition, the cowl top cover 10 also receives the impact force of the object 9 from the upper side through the hood 4 and the seal member 8, and causes the cover body section 11 and the upper extending section 14 to be displaced downward. On the other hand, the panel fixing section 15 disposed in the lower end section of the vertical wall section 13 is fixed by the support section of the vehicle body panel 2 to be supported, and therefore the vertical wall section 13 of the cowl top cover 10 is deformed in a manner so as to be crushed so as to reduce the height dimension in the vertical direction.

In this case, even if formed with a predetermined plate thickness so that the desired strength can be obtained, the vertical wall body 21 of the vertical wall section 13 includes the recessed groove section 21b constituting the vertical wall side deformation promotion section in a substantially central section in the vertical direction, and therefore, is buckled in the central part where the recessed groove section 21b is formed when receiving a certain size or more of the impact force N, and can be stably bent and deformed in a manner so as to be crushed in the vertical direction while causing the central part to be displaced rearward.

In addition, the cover section 30 engaged with the vertical wall body 21 receives the stress in the direction of reducing the height dimension in the vertical direction from the vertical wall body 21 through the left and right insertion claw sections 33 and hold claw sections 34. In this case, even when the cover section 30 has a predetermined plate thickness, the swelling section 32 constituting the cover-side bending promotion section along the lateral direction swells frontward, and therefore the received stress acts on the swelling section 32, whereby the swelling section 32 is buckled, and can be stably bent and deformed in a manner so as to be crushed in the vertical direction while the ridge section 32c of the swelling section 32 is displaced frontward.

Furthermore, in the cover section 30, the locking claw 33a of the insertion claw section 33 is, as described above, configured to be detached from the first engaging section of the vertical wall body 21 when the cover section 30 is bent and deformed, and the ridge section 32c of the swelling section 32 moves frontward by the frontward swelling of the swelling section 32 during the bending deformation of the cover section 30. For this reason, as shown in FIG. 5, while being crushed in the vertical direction by the buckling of the swelling section 32, the cover section 30 releases the engagement between the insertion claw section 33 and the hold claw section 34 and the first and second engaging sections of the vertical wall body 21, and can be easily removed from the vertical wall body 21 to be disengaged (drop) frontward. Thereby, the reduction in the bending promotion due to the cover section 30 remaining while being engaged with the vertical wall body 21 can be prevented, and the deformation of the vertical wall section 13 can be stably promoted.

Thus, in the cowl top cover 10 of the present first embodiment, when the impact force N from the upper side is received, irrespective of the collision position and the collision direction of the object 9, the vertical wall body 21 of the vertical wall section 13 and the cover section 30 are bent and deformed in the direction of being separated from each other, and furthermore the cover section 30 can be removed from the vertical wall body 21 to be separated. For this reason, when the vertical wall body 21 and the cover section 30 are crushed, the cover section 30 is prevented from interfering with the bending deformation of the vertical wall body 21, and the cover section 30 and the vertical wall body 21 can be stably and reliably crushed so that the height dimension is reduced, and therefore the hood 4 can be displaced further downward. Therefore, in the cowl top cover 10 of the present first embodiment, an excellent impact absorption function can be stably exhibited.

As a result, the magnitude of the impact the object 9 receives by the collision with the hood 4 can be effectively absorbed to be relaxed by the deformation of the hood 4, seal member 8, and the cowl top cover 10, as described above, and therefore the damage the object 9 receives can be reduced as much as possible, and the object 9 can be protected.

It should be noted that in the cowl top cover 10 according to the first embodiment, the vertical wall body 21 of the vertical wall section 13 is, as described above, linearly suspended from the cover body section 11 with a predetermined plate thickness, and the recessed groove section 21b is recessed in the substantially central section in the vertical direction of the vertical wall body 21. However, in the invention, the configuration of the vertical wall body in the vertical wall section is not limited thereto, and if the predetermined strength of the vertical wall section can be secured, and the deformation of the vertical wall body can smoothly proceed without being inhibited by the cover section when the vertical wall body receives the stress to be deformed in a manner so as to be crushed, the vertical wall body may employ other configurations.

Figure 6:
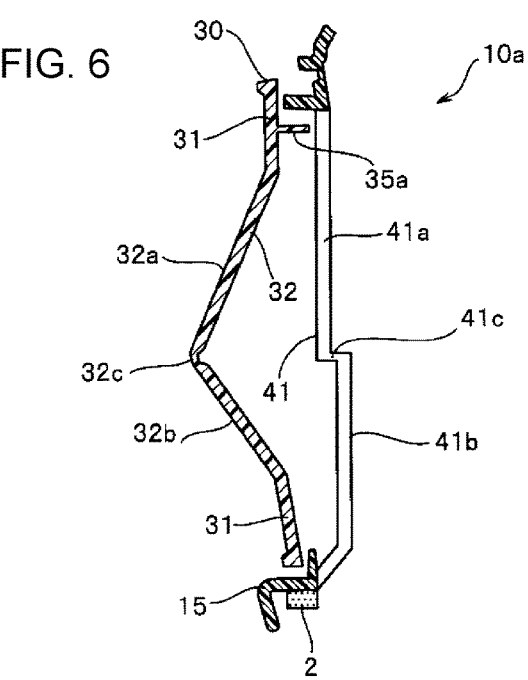
FIG. 6 is a cross-sectional view showing a modification of the front wall body of the cowl top cover.

For example, as shown in the modification in FIG. 6, the vertical wall body 41 according to the modification includes an upper half section 41*a* extending linearly downward from the cover body section 11, a lower half section 41*b* disposed to be rearward shifted substantially in parallel with the upper half section 41*a*, and a connecting section 41*c* connecting between the lower end section of the upper half section 41*a* and the upper end section of the lower half section 41*b* in a crank shape in the cross-sectional view in FIG. 6. In this case, the connecting section 41*c* is formed throughout in the vehicle width direction of the vertical wall section 13, and is configured as the vertical wall side deformation promotion section (breaking section) configured to break and to prompt the deformation of the vertical wall body 41 when the vertical wall body 41 receives a certain magnitude or more of the impact load from the upper side.

When the cowl top cover 10*a* including the vertical wall body 41 receives the impact force N from the upper side as with the case in the above-described first embodiment, the connecting section 41*c* of the vertical wall body 41 breaks, and the upper half section 41*a* and the lower half section 41*b* of the vertical wall body 41 are separated, and furthermore, the divided upper half section 41*a* descends on the front side of the lower half section 41*b*, whereby the vertical wall body 41 can be deformed in a manner so as to be crushed in the vertical direction.

On the other hand, as described above, the cover section 30 engaged with the vertical wall body 41 can be bent and deformed in a manner so as to be crushed in the vertical direction while displacing the ridge section 32*c* of the swelling section 32 frontward, and furthermore, removed from the vertical wall body 41 to be detached frontward.

Thus, when the vertical wall body 41 and the cover section 30 are crushed, even the cowl top cover 10*a* having a difference in the form of the vertical wall body 41 from the vertical wall body 21 in the above-described first embodiment can prevent the cover section 30 from interfering with the deformation of the vertical wall body 41, and can crush the cover section 30 and the vertical wall body 41 stably and reliably so that the height dimension is reduced, and therefore the excellent impact absorption function can be stably exhibited.

Figure 7:
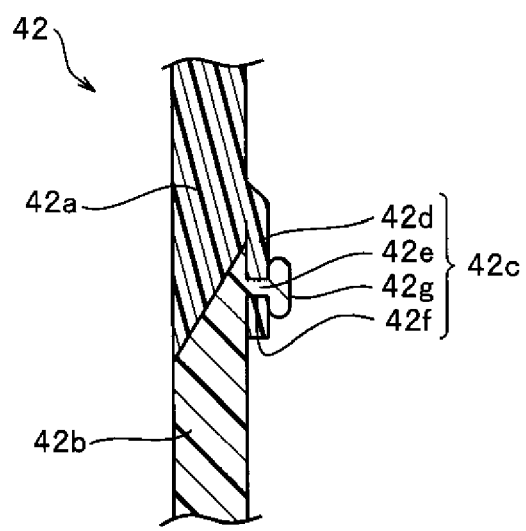
FIG. 7 is a principal part enlarged cross-sectional view showing another modification of the front wall body of the cowl top cover.

On the other hand, even the cowl top cover including the vertical wall body 42 according to another modification shown in FIG. 7 can obtain the same effects as the cowl top cover 10*a* shown in FIG. 6. The vertical wall body 42 shown in FIG. 7 includes an upper half section 42*a* extending linearly downward from the cover body section, a lower half section 42*b* disposed in parallel on the lower side of the upper half section 42*a*, and a connecting section 42*c* connecting the upper half section 42*a* and the lower half section 42*b*, and as described below, the connecting section 42*c* constitutes the vertical wall side deformation promotion section configured to break to prompt the deformation of the vertical wall body 42.

The lower end surface of the upper half section 42*a* and the upper end surface of the lower half section 42*b* are formed on the inclined surfaces inclined downward and frontward, and the upper half section 42*a* and the lower half section 42*b* are connected vertically through the connecting section 42*c* in a state where each of the inclined surfaces is combined with each other.

In this case, the connecting section 42*c* connecting the upper half section 42*a* and the lower half section 42*b* includes an elastically deformable tongue piece section 42*d* extended from the rear surface of the lower end section of the upper half section 42*a*, and a locking protrusion section 42*e* protruded on the rear side of the upper end section of the lower half section 42*b*, and a locking hole 42*f* for inserting the locking protrusion section 42*e* is bored in the tongue piece section 42*d*. The locking protrusion section 42*e* of the connecting section 42*c* includes an engaging head section 42*g* formed by the tip section of the locking protrusion section 42*e* being crushed while being heated toward the tongue piece section 42*d* side after the locking protrusion section 42*e* is inserted into the locking hole 42*f* of the tongue piece section 42*d* to be held in a state of the tongue piece section 42*d* being hooked, and the tongue piece section 42*d* is held so as not to be removed from the locking protrusion section 42*e* by the engaging head section 42*g*.

Figure 8:
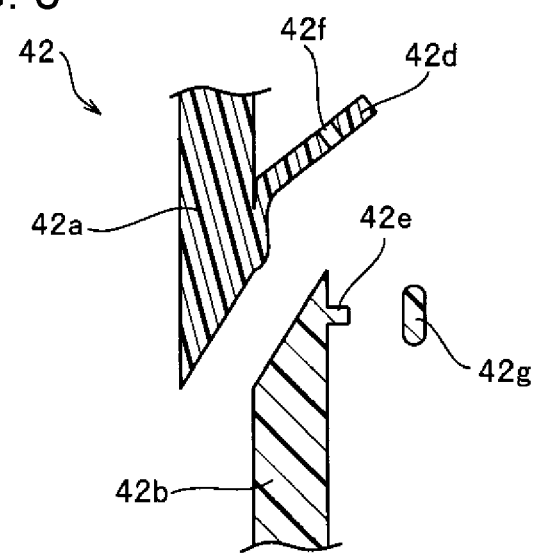
FIG. 8 is a cross-sectional illustrative diagram illustrating the state where part of the front wall body is broken.

When the cowl top cover including this vertical wall body 42 receives the impact force N from the upper side, as shown in FIG. 8, the boundary section between the locking protrusion section 42*e* and the engaging head section 42*g* in the connecting section 42*c* to be the vertical wall side deformation promotion section is broken, and the engaging head section 42*g* is decoupled from the locking protrusion section 42*e*, whereby the tongue piece section 42*d* is removed from the locking protrusion section 42*e*, and the engagement state is released.

As a result, the upper half section 42*a* and the lower half section 42*b* of the vertical wall body 42 are separated, and furthermore, the divided upper half section 42*a* descends while moving on the front side of the lower half section 42*b*, whereby the vertical wall body 42 can be easily deformed in a manner so as to be crushed in the vertical direction. Therefore, even in the cowl top cover including the vertical wall body 42 according to the modification, an excellent impact absorption function can be stably exhibited.

Second Embodiment

Figure 9:
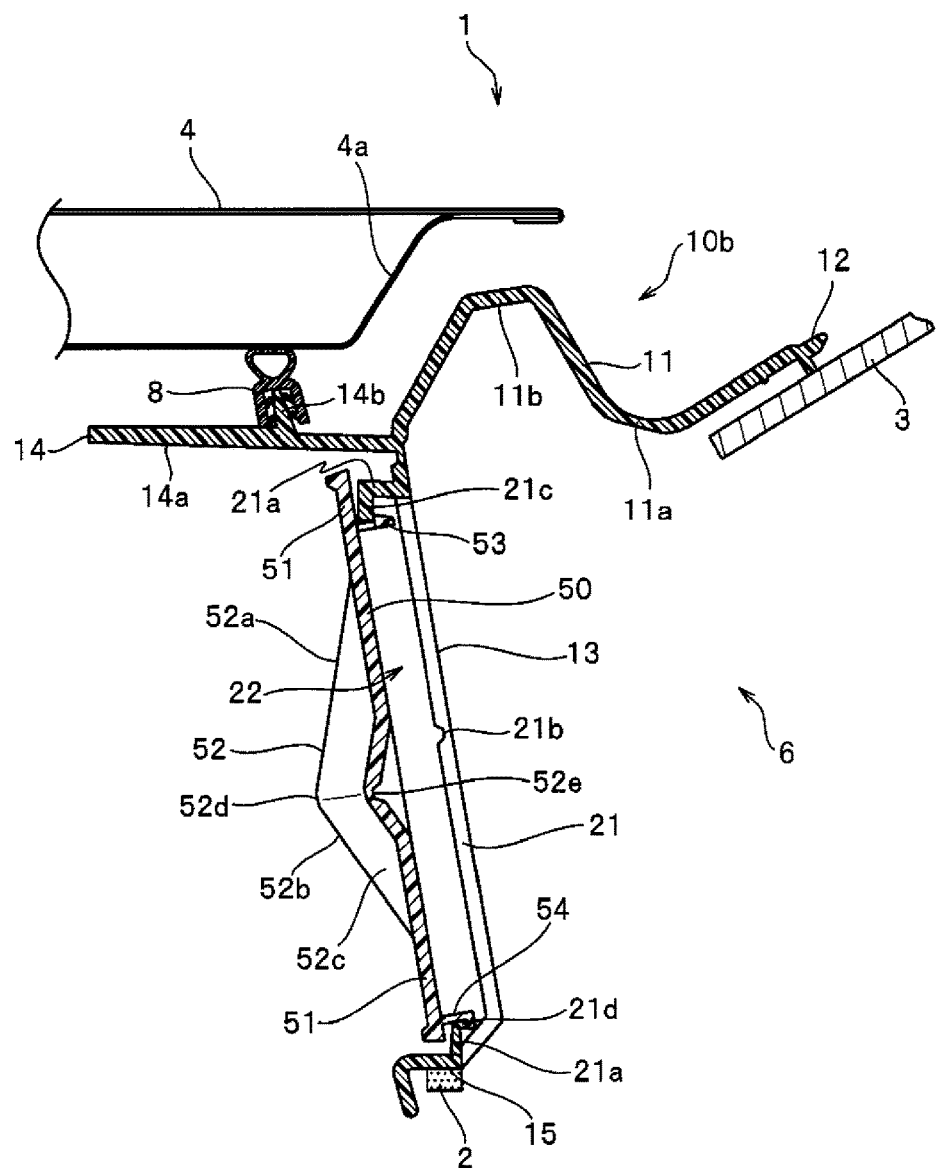
FIG. 9 is a cross-sectional view showing a cross-section of the cowl top cover according to a second embodiment of the invention.
Figure 10:
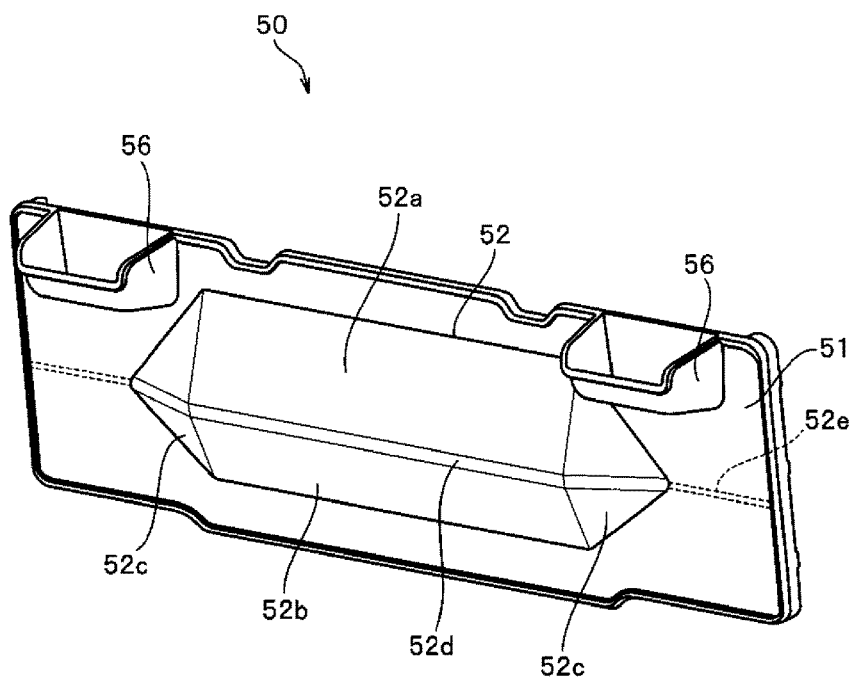
FIG. 10 is a perspective view of a cover section of the cowl top cover seen obliquely from the front side.
Figure 11:
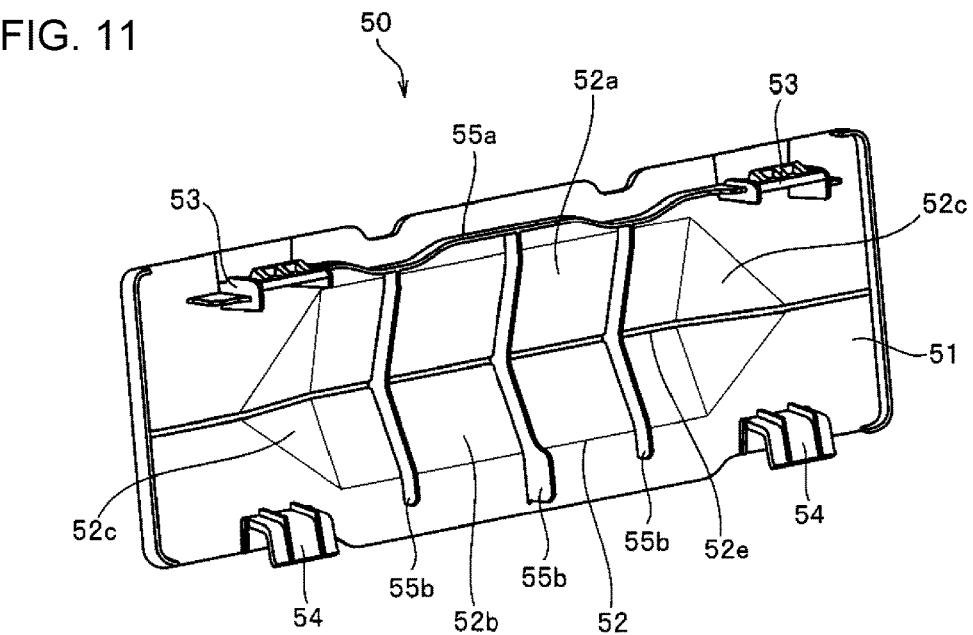
FIG. 11 is a perspective view of the cover section seen obliquely from the rear side.

FIG. 9 is a cross-sectional view showing a cross-section of the cowl top cover according to the second embodiment of the invention. FIGS. 10 and 11 are perspective views of a cover section of the cowl top cover seen obliquely from the front and rear sides. It should be noted that in the present second embodiment and the third embodiment described below, although the form of the cover section of the cowl top cover is different, the configuration other than the cover section is substantially the same as those in the cowl top cover in the above-described first embodiment, and therefore the description will be made by focusing on the cover section, and the same member as in the first embodiment described above will be represented by using the same reference numerals, whereby the detailed description will be omitted.

The vertical wall section 13 of the cowl top cover 10*b* in the present second embodiment includes a vertical wall body 21, an opening 22 formed in the vertical wall body 21, and a cover section 50 attachable to and detachable from the vertical wall body 21. In addition, the vertical wall body 21 includes a frame section 21*a* formed around the opening 22, a first engaging section 21*c* disposed in the upper side section of the frame section 21*a* and to be engaged with the insertion claw section 53 described below of the cover section 50, and a second engaging section 21*d* disposed in the lower side section of the frame section 21*a* and to be engaged with the hold claw section 54 described below of the cover section 50.

In this case, as shown in FIG. 9, the first engaging section 21*c* includes a locking wall section suspended from the upper side section of the frame section 21*a* in the position corresponding to the insertion claw section 53 of the cover section 50. In addition, the second engaging section 21d includes abase section extending from the lower side section of the frame section 21a in the position corresponding to the hold claw section 54 of the cover section 50, and a recessed notch section formed at the tip section of the base section, fitting the hold claw section 54. Furthermore, in the substantially central section in the vertical direction of the vertical wall body 21, the recessed groove section 21b to be the vertical wall side deformation promotion section is recessed along the vehicle width direction.

The cover section 50 in the present second embodiment includes a cover section body 51, and a swelling section 52 configured to swell in a V-shape on the front side with respect to the cover section body 51 when the cross section perpendicular to the vehicle width direction is viewed. In particular, the swelling section 52 in the present second embodiment is disposed in a partial region on the central side in the vehicle width direction of the cover section 50, and the swelling section 52 is not disposed on the left and right side edge section side of the cover section 50, and the flat cover section body 51 is disposed.

The swelling section 52 constitutes a cover-side bending promotion section configured to prompt the cover section 50 to bend and deform in the desired behavior, and the cover section 50 includes the swelling section 52, whereby, as with the cover section 30 in the above first embodiment, when the cowl top cover 10b receives an impact, the entire cover section 50 can be bent and deformed in such behavior as to be crushed in the vehicle height direction while the ridge section 52d of the swelling section 52 is displaced frontward.

In this case, the swelling section 52 is disposed so that the maximum dimension in the vehicle width direction of the swelling section 52 has the magnitude of 30% or more, in particular 50% or more, of the dimension in the vehicle width direction of the entire cover section 50. The swelling section 52 is provided in this range, whereby when the vertical wall body 21 is deformed in a manner so as to be crushed, the bending deformation of the cover section 50 can be effectively promoted, and the cover section 50 can be stably crushed.

In addition, the swelling section 52 includes an upper inclined section 52a inclined downward and frontward from the boundary section with the cover section body 51 on the upper side, a lower inclined section 52b inclined upward and frontward from the boundary section with the cover section body 51 on the lower side, and a gradually decreasing section 52c disposed on both left and right sides of the upper and lower inclined sections 52a and 52b, causing the frontward swelling amount with respect to the cover section body 51 to gradually decrease toward the left and right side edge sides of the cover section 50, and the entire swelling section 52 is formed so as to protrude in a tent shape with respect to cover section body 51. Furthermore, a ridge section 52d is formed between the upper and lower inclined sections 52a and 52b in the swelling section 52, and the ridge section 52d is disposed slightly lower than the height position of the center line in the vertical direction of the cover section 50.

Furthermore, on the rear surface (inner wall surface) side of the swelling section 52 and the cover section body 51, the recessed groove section 52e is recessed along the vehicle width direction at the same height as the ridge section 52d as the cover-side bending promotion section, and constitutes the cover section 50 (in particular, the swelling section 52 and the cover section body 51) easier to bend, along with the swelling section 52 to be the cover-side bending promotion section.

In addition, the cover section 50 in the present second embodiment includes, as with the cover section 30 in the above first embodiment, two insertion claw sections 53 protruding rearward from the rear surface of the upper end section of the cover section 50, two hold claw sections 54 protruding substantially in an L-shape rearward from the rear surface of the lower end section of the cover section 50, a reinforcement lateral rib 55a and a reinforcement vertical rib 55b erected on the rear surface of the cover section 50, and two handle sections 56 disposed on the front surface of the upper end section of the cover section 50.

In this case, the left and right insertion claw sections 53 and hold claw sections 54 are disposed so that the forming region in the vehicle width direction is included within the forming region in the vehicle width direction of the swelling section 52 formed in a tent shape. In particular, in the present second embodiment, the left and right insertion claw sections 53 and hold claw sections 54 are disposed so as to correspond to the positions of the left and right ends of the swelling section 52 in the vehicle width direction.

As with the cowl top cover 10 according to the above-described first embodiment, when receiving the impact force from the upper side, the cowl top cover 10b including the cover section 50 in the present second embodiment can bend and deform the vertical wall body 21 of the vertical wall section 13 and the cover section 50 in the direction of separating them from each other, and furthermore, can remove the cover section 50 from the vertical wall body 21 to separate.

For this reason, when the vertical wall body 21 and the cover section 50 are crushed, the cover section 50 can be prevented from interfering with the bending deformation of the vertical wall body 21, and the cover section 50 and the vertical wall body 21 can be stably and reliably crushed so that the height dimension is reduced. Therefore, even in the cowl top cover 10b according to the present second embodiment, an excellent impact absorption function can be stably exhibited.

Furthermore, in the cover section 50 in the present second embodiment, the swelling section 52 is disposed in a partial region on the central side in the vehicle width direction of the cover section 50, and the flat cover section body 51 is disposed on the left and right side edge sections of the cover section 50. For this reason, when the cover section 50 is engaged with the vertical wall body 21 in such a manner as to block the opening 22 of the cowl top cover 10b, it can be an easily continuous surface with the flat formed vertical wall section 13, and therefore the appearance can be improved. In addition, in the upper and lower end sections and the left and right side edge sections of the cover section 50, the sealing performance of the vertical wall body 21 can be easily increased, and therefore the hot air and odors from the engine room can be effectively prevented from entering the cowl section through the opening 22.

Third Embodiment

Figure 12:
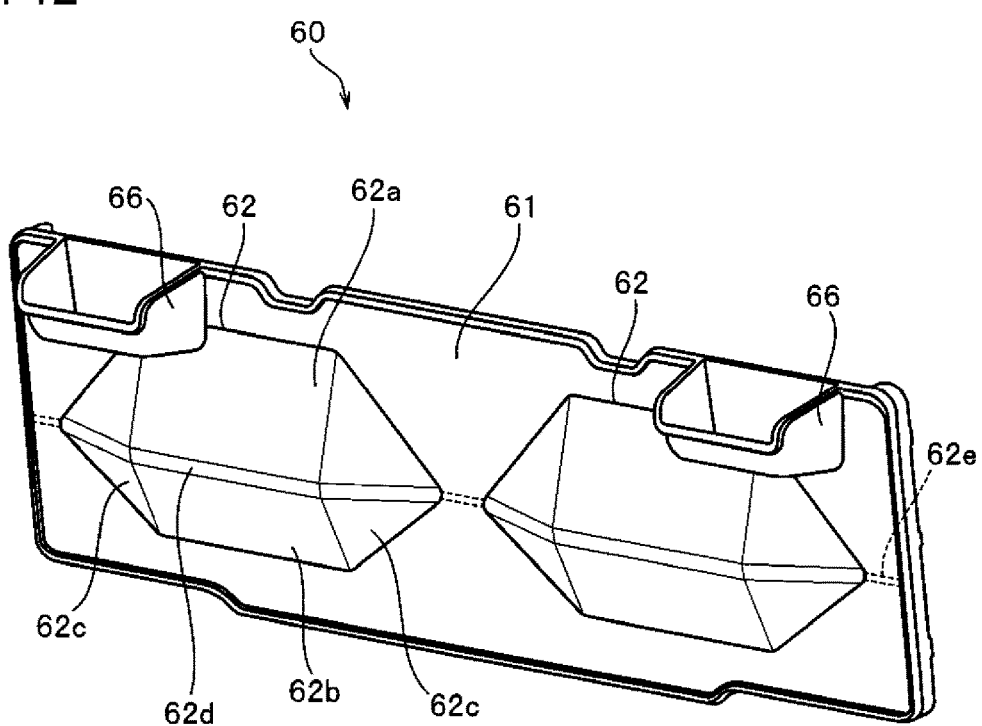
FIG. 12 is a perspective view of a cover section of the cowl top cover seen obliquely from the front side according to a third embodiment of the invention.

FIG. 12 is a perspective view of a cover section of the cowl top cover seen obliquely from the front side according to the present third embodiment.

The cover section 60 in the present third embodiment includes a cover section body 61, and two swelling sections 62 configured to swell in a V-shape on the front side with respect to the cover section body 61 when the cross section perpendicular to the vehicle width direction is viewed. In particular, the two swelling sections 62 in the present third embodiment are bilaterally symmetrically formed with respect to the center line in the vehicle width direction of the cover section 60, and a flat cover section body 61 is disposed in the region on the left and right side edge sides of the cover section 60 and in the region between the two swelling sections 62.

In this case, the left and right two swelling sections 62 are disposed so that the sum of the maximum dimension in the vehicle width direction of each of the swelling sections 62 has the magnitude of 30% or more, in particular 50% or more, of the dimension in the vehicle width direction of the entire cover section 60.

In addition, each of the left and right swelling sections 62 includes an upper inclined section 62*a* inclined downward and frontward from the boundary section with the cover section body 61 on the upper side, a lower inclined section 62*b* inclined upward and frontward from the boundary section with the cover section body 61 on the lower side, and a gradually decreasing section 62*c* disposed on both left and right sides of the upper and lower inclined sections 62*a* and 62*b*, and each of the swelling sections 62 is formed so as to protrude in a tent shape with respect to the cover section body 61. Furthermore, a ridge section 62*d* is formed in the substantially central section in the vertical direction of each of the swelling sections 62, and the ridge section 62*d* is disposed slightly lower than the height position of the center line in the vertical direction of the cover section 60.

Each of the left and right swelling sections 62 constitutes a cover-side bending promotion section configured to prompt the cover section 60 to bend and deform in the desired behavior, and the cover section 60 includes the two swelling sections 62, whereby when the cowl top cover receives an impact, the entire cover section 60 can be bent and deformed in such behavior as to be crushed in the vehicle height direction while the ridge section 62*d* of the swelling section 62 is displaced frontward.

Furthermore, on the rear surface (inner wall surface) side of the swelling section 62 and the cover section body 61, the recessed groove section 62*e* is recessed along the vehicle width direction at the same height as the ridge section 62*d* as the cover-side bending promotion section, and constitutes the cover section 60 (in particular, the swelling section 62 and the cover section body 61) easier to bend, along with the swelling section 62 to be the cover-side bending promotion section.

In addition, the cover section 60 in the present third embodiment includes, as with the cover sections 30 and 50 in the above first and second embodiments, left and right insertion claw sections and hold claw sections (not shown), and a reinforcement lateral rib and a reinforcement vertical rib on the rear surface side of the cover section 60, and two handle sections 66 disposed on the front side of the cover section 60. In this case, the left and right insertion claw sections and hold claw sections are disposed so that the forming region in the vehicle width direction is included within the forming region in the vehicle width direction of the left and right swelling sections 62 formed in a tent shape.

As with the cowl top covers 10 and 10*b* according to the above-described first and second embodiments, when receiving the impact force from the upper side, the cowl top cover including the cover section 60 in the present third embodiment can bend and deform the vertical wall body 21 of the vertical wall section 13 and the cover section 60 in the direction of separating them from each other, and furthermore, can remove the cover section 60 from the vertical wall body 21 to separate.

For this reason, when the vertical wall body 21 and the cover section 60 are crushed, the cover section 60 can be prevented from interfering with the bending deformation of the vertical wall body 21, and the cover section 60 and the vertical wall body 21 can be stably and reliably crushed so that the height dimension is reduced. Therefore, even in the cowl top cover according to the present third embodiment, an excellent impact absorption function can be stably exhibited.

Furthermore, as with the cover section 50 in the above second embodiment, when engaged with the vertical wall body 21 in such a manner as to block the opening 22 of the cowl top cover, the cover section 60 in the present third embodiment can improve the appearance of the vertical wall section 13. In addition, in the upper and lower end sections and the left and right side edge sections of the cover section 60, the sealing performance of the vertical wall body 21 can be increased, and therefore the hot air and odors from the engine room can be effectively prevented from entering the cowl section through the opening 22.

The invention claimed is:

1. A cowl top cover comprising:
a cover body section configured to cover a cowl section disposed between a windshield and a hood of a vehicle; and
a vertical wall section suspended from one end section of the cover body section,
wherein the vertical wall section comprises:
a vertical wall body,
at least one opening formed in the vertical wall body, and
a cover section configured to cover the opening, the cover section attachable to and detachable from the vertical wall body,
the cover section comprises a cover-side bending promotion section disposed along a vehicle width direction, the cover-side bending promotion section configured to prompt bending deformation on one side in a vehicle length direction,
the cover-side bending promotion section comprises a swelling section configured to swell on one side in a vehicle length direction,
the swelling section of the cover section is disposed in a central region in a vehicle width direction in the cover section, and
in a peripheral section of the swelling section, a flat cover section body is disposed along the vertical wall body.

2. The cowl top cover according to claim 1, wherein the swelling section swells in a V-shape.

3. The cowl top cover according to claim 1, wherein the swelling section swells frontward in a vehicle length direction.

4. The cowl top cover according to claim 1, wherein a maximum dimension in a vehicle width direction of the swelling section is set to 30% or more of a dimension in a vehicle width direction of the cover section.

5. The cowl top cover according to claim 1,
wherein in an upper end section and a lower end section of the cover section, an upper side claw section and a lower side claw section engageable with and disengageable from the vertical wall body are respectively disposed, and
the upper side claw section and the lower side claw section are disposed in a position corresponding to a forming region of the swelling section in a vehicle width direction, and in a position corresponding to an end section of the swelling section.

6. The cowl top cover according to claim 1, wherein in the cover section, at least one reinforcement vertical rib is disposed, and the reinforcement vertical rib has a bent form so as to protrude in a direction where the cover-side bending promotion section prompts bending deformation.

7. The cowl top cover according to claim 1, wherein the swelling section includes
    an upper inclined section and a lower inclined section inclined toward one side in a vehicle length direction from the cover section body, and
    a gradually decreasing section disposed on both left and right sides of the upper inclined section and the lower inclined section, the gradually decreasing section causing a swelling amount with respect to the cover section body to gradually decrease toward the left and right side edge sides of the cover section.

8. The cowl top cover according to claim 7,
    wherein a recessed groove section is recessed on a surface facing the other side in a vehicle length direction in the cover section body and the swelling section, and
    the recessed groove section is disposed corresponding to a height position where a ridge section between the upper inclined section and the lower inclined section in the swelling section is disposed.

9. The cowl top cover according to claim 7, wherein a ridge section between the upper inclined section and the lower inclined section in the swelling section is disposed lower than a height position of a center line in a vehicle height direction of the cover section along a vehicle width direction.

10. The cowl top cover according to claim 9,
    wherein a recessed groove section is recessed on a surface facing the other side in a vehicle length direction in the cover section body and the swelling section, and
    the recessed groove section is disposed corresponding to the height position where the ridge section between the upper inclined section and the lower inclined section in the swelling section is disposed.

* * * * *